UNITED STATES PATENT OFFICE.

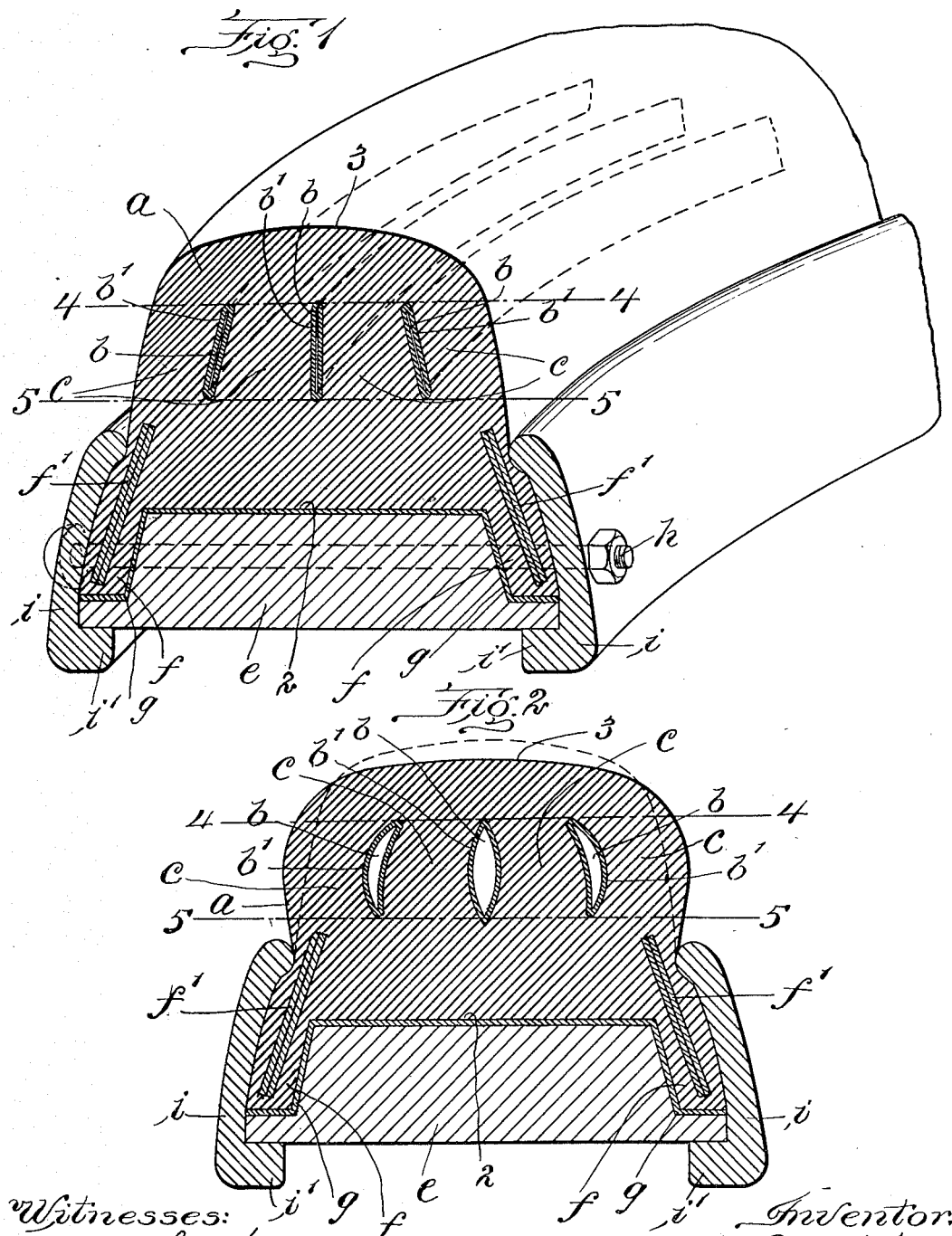

WILLIAM R. SMITH, OF BUFFALO, NEW YORK, ASSIGNOR OF ONE-HALF TO HERBERT H. HEWITT, OF BUFFALO, NEW YORK.

ELASTIC TIRE FOR WHEELS.

No. 852,002.  Specification of Letters Patent.  Patented April 30, 1907.

Application filed May 8, 1906. Serial No. 315,804.

*To all whom it may concern:*

Be it known that I, WILLIAM R. SMITH, of Buffalo, in the county of Erie and State of New York, have invented certain new and useful Improvements in Elastic Tires for Wheels, of which the following is a specification.

This invention relates to so-called solid elastic tires, which are devoid of permanent internal openings or air spaces.

The invention consists in a tire comprising a resilient body which normally resembles the ordinary solid tire body in its continuity or absence of internal air spaces, but is internally subdivided by longitudinal slits, the sides of which are normally closed by the resilience of the body, said slits increasing the resilience of the tread portion by subdividing an annular portion of it into annular elastic legs, which connect the tread portion with the base portion seated on the wheel-rim, said legs being adapted to be independently flexed laterally by compressive pressure exerted on the tread.

Of the accompanying drawings, forming a part of this specification,—Figure 1 represents a perspective sectional view, showing a tire embodying my invention, as it appears when not under compression. Fig. 2 represents a similar view, showing the tire under compression.

The same reference characters indicate the same parts in both the figures.

In the drawings,—$a$ represents an elastic tire, which is composed of a body of vulcanized rubber or other suitable elastic material, having an inner surface 2 adapted to be seated on a wheel-rim, and an outer tread surface 3. The tire may have any desired form in cross-section.

In carrying out my invention, I form one or more, and preferably three, narrow slits $b$ in the body of the tire, said slits extending longitudinally entirely around the tire, between the outer and inner surfaces thereof, and being arranged edgewise to the tread surface. When the tire is not under compression, the sides of the slits are forced together, by the resilience of the body of the tire, as indicated in Fig. 1. When the tire is under compression, the sides of the slits separate, as shown in Fig. 2. The slits may be formed by embedding, in the unvulcanized material of the tire, flattened tubes or bushings $b'$ faced externally with a material which will unite with the material of the tire by vulcanization, and faced internally with a material which is non-adhesive and will not vulcanize. The said bushings are flattened when incorporated in the tire, and in the completed tire their inner sides are adapted to be separated.

It will be seen that the slits subdivide an annular portion of the tire between the dotted lines. 4—4 and 5—5 into annular legs, $c$, which are adapted to be flexed independently by compressive pressure applied to the tread, as shown in Fig. 2, so that the said portion offers less resistance to compressive pressure applied to the tread than would be the case if the slits $b$ were not provided. The slits being normally closed, do not involve any substantial decrease of the amount of elastic material (usually termed rubber) within a given area, so that the bulk of the tire does not have to be increased to compensate for permanently open air chambers, substantially the entire cross sectional area of the tire being occupied by the resilient material thereof.

The described tire may be secured to a wheel-rim $e$ by any suitable means. I have here shown the tire provided at its edges with inwardly-projecting flanges $f$ $f$, which may be reinforced by layers $f'$ $f'$ of canvas or other suitable material incorporated in the flanges, and secured thereto by vulcanization. The flanges $f$ $f$ enter recesses $g$ $g$, formed for their reception in the wheel-rim $e$, and are perforated to receive attaching bolts $h$, which pass through the said flanges, the intermediate portion of the wheel-rim, and external annular clamping-plates $i$ secured by the bolts $h$ and bearing on the outer sides of the flanges $f$. The said plates $i$ are provided with inwardly-projecting flanges $i'$, which bear on the inner surface of the wheel-rim, and relieve the bolts of a considerable part of any strain tending to force the tire and flanges outwardly. The plates $i$ are thus detachably secured by the bolts $h$, their inner sides being inclined and overhanging the correspondingly inclined outer sides of the flanges $f$ and the inner portions of the sides of the body of the tire.

I claim:

An elastic tire comprising a resilient body of vulcanized rubber, and flattened non-metallic flexible bushings having internal surfaces of unvulcanizable or non-adhesive material embedded in said body, and normally closed or pressed together by the resilience of the body, so that substantially the entire cross sectional area of the body is occupied by the resilient material thereof, the flattened sides of said bushings being separable and constituting the sides of slits in the said body.

In testimony whereof I have affixed my signature, in presence of two witnesses.

WILLIAM R. SMITH.

Witnesses:
C. F. BROWN,
E. BATCHELDER.